(12) United States Patent
Kim

(10) Patent No.: US 9,123,948 B2
(45) Date of Patent: Sep. 1, 2015

(54) SECONDARY BATTERY

(75) Inventor: Chan-Seok Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 854 days.

(21) Appl. No.: 13/238,554

(22) Filed: Sep. 21, 2011

(65) Prior Publication Data
US 2012/0177981 A1      Jul. 12, 2012

(30) Foreign Application Priority Data

Jan. 12, 2011   (KR) .................. 10-2011-0003109

(51) Int. Cl.
H01M 2/20     (2006.01)
H01M 2/22     (2006.01)
H01M 2/26     (2006.01)

(52) U.S. Cl.
CPC .................................... *H01M 2/266* (2013.01)

(58) Field of Classification Search
CPC ................................. H01M 2/22; H01M 2/26
USPC ................................................. 429/121–347
See application file for complete search history.

(56) References Cited

U.S. PATENT DOCUMENTS

| | | | | |
|---|---|---|---|---|
| 5,510,203 | A * | 4/1996 | Hamada et al. ................. | 429/53 |
| 6,387,567 | B1 * | 5/2002 | Noh .............................. | 429/211 |
| 2003/0148173 | A1 | 8/2003 | Gu | |
| 2007/0196732 | A1 | 8/2007 | Tatebayashi et al. | |
| 2009/0197160 | A1 * | 8/2009 | Fujiwara et al. .............. | 429/146 |
| 2010/0047685 | A1 | 2/2010 | Lee et al. | |
| 2010/0081052 | A1 | 4/2010 | Morishima et al. | |

FOREIGN PATENT DOCUMENTS

| | | | |
|---|---|---|---|
| CN | 1437273 A | 8/2003 | |
| EP | 2169744 A1 | 3/2010 | |
| JP | 11-162444 | 6/1999 | |
| JP | 2007-059249 | 3/2007 | |
| JP | 2009-187768 | * 8/2009 | ............. H01M 2/26 |
| KR | 10-2006-0134549 A | 12/2006 | |
| KR | 10-2007-0085150 A | 8/2007 | |
| KR | 10-2007-0110566 | 11/2007 | |

OTHER PUBLICATIONS

Oi et al. JP 2009-187768. Aug. 20, 2009. English machine translation by JPO.*

(Continued)

*Primary Examiner* — Kenneth Douyette
*Assistant Examiner* — James Lee
(74) *Attorney, Agent, or Firm* — Robert E. Bushnell, Esq.

(57) ABSTRACT

A secondary battery includes an electrode assembly. The electrode assembly includes a first electrode plate provided with a first tab portion, a second electrode plate provided with a second tab portion, and a separator interposed between the electrode plates. In the electrode assembly, the width of the first or second tab portion is in the range from over 0.5 of the half of the width of each of the electrode plates to below the half of the width of each of the electrode plates, and the first or second tab portion is provided to have a spacing distance b from a central portion of the first or second electrode plate to a starting portion of the first or second tab portion. The spacing distance is in the range from over 0 mm to less than half of the half (¼) of the width of the first or second electrode plate.

17 Claims, 5 Drawing Sheets

(56) References Cited

OTHER PUBLICATIONS

Korean Office Action issued on Jun. 13, 2012 by the Korean Patent Office in the corresponding Korean Patent Application No. 10-2011-0003109.

Korean Notice of Allowance issued on Dec. 4, 2012 in connection with Korean Patent Application Serial No. 10-2011-0003109 and Request for Entry of the Accompanying Office Action attached herewith.

Chinese Office Action issued by Chinese Patent Office on Feb. 17, 2015 in connection with Chinese Patent Application No. 201110382122.8 which also claims Korean Patent Application No. 2011-0003109 as its priority document.

\* cited by examiner

SECONDARY BATTERY

CLAIM OF PRIORITY

This application claims the benefit of Korean Patent Application No. 10-2011-0003109, filed on Jan. 12, 2011, in the Korean Intellectual Property Office, the disclosure of which is incorporated herein in its entirety by reference.

BACKGROUND OF THE INVENTION

1. Field of the Invention

An aspect of the present invention relates to a secondary battery.

2. Description of the Related Art

In general, an electrode assembly includes a positive electrode plate, a negative electrode plate, and a separator interposed therebetween. A secondary battery is manufactured by accommodating the electrode assembly and an electrolyte in an outer case.

In a large-capacity secondary battery, as the size of an electrode plate increases, a region in which current does not flow may exist in the electrode plate. Therefore, the capacity efficiency in a high-capacity battery using a large-area electrode plate may be decreased.

The above information disclosed in this Related Art section is only for enhancement of understanding of the background of the invention and therefore it may contain information that does not form the prior art that is already known to a person of ordinary skill in the art.

SUMMARY OF THE INVENTION

Exemplary embodiments provide a secondary battery having a reduced distance of current flowing in each electrode plate.

Exemplary embodiments also provide a secondary battery capable of effectively using electrode plates.

Exemplary embodiments also provide a secondary battery having a gentle angle obtained by punching a tab portion of each electrode plate.

According to an aspect of the present invention, there is provided a secondary battery that may include an electrode assembly, wherein the electrode assembly may include a first electrode plate provided with a first tab portion; a second electrode plate provided with a second tab portion; and a separator interposed between the electrode plates, wherein at least one of the first and second tab portions are formed so that the width of each of the tab portions and the distance from a central portion of each of the electrode plates to a starting portion of each of the tab portions satisfy the following expression, $0.5x < a < x$ $0 < b < 0.5x$ (a: width of each of the tab portions, b: distance from the central portion of each of the electrode plates to the starting portion of each of the tab portions, and x: ½ of the entire width of each of the electrode plates).

The electrode assembly may be a stacked electrode assembly formed by stacking a plurality of first and second electrode plates.

The first or second electrode plate may be formed in the shape of a rectangle composed of minor- and major axis corners, and the first or second tab portion may be vertically protruded from the short-axis corner of the first or second electrode plate. The length of the major-axis corner of the first or second electrode plate may be less than two times greater than that of the minor-axis corner of the first or second electrode plate.

The first and second tab portions may be extracted from the same portions of the respective first and second electrode plates in the electrode assembly. The interval between the first and second tab portions may be in the range from over 0 mm to below 500 mm.

At least one corner of the first or second tab portion may be chamfered. The first or second tab portion may be chamfered in a round shape.

As described above, according to exemplary embodiments of the present invention, it is possible to have a secondary battery in which the distance of current flowing in each electrode plate is decreased, so that the power characteristic of the secondary battery is improved and it is advantageous to use the secondary battery in high-rate charge/discharge.

Also, it is possible to provide an effective secondary battery having a larger capacity using electrode plates with the same area.

Also, it is possible to provide a secondary battery in which the angle obtained by punching a tab portion of each electrode plate is gentle, thereby preventing the generation of burrs, or the like.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
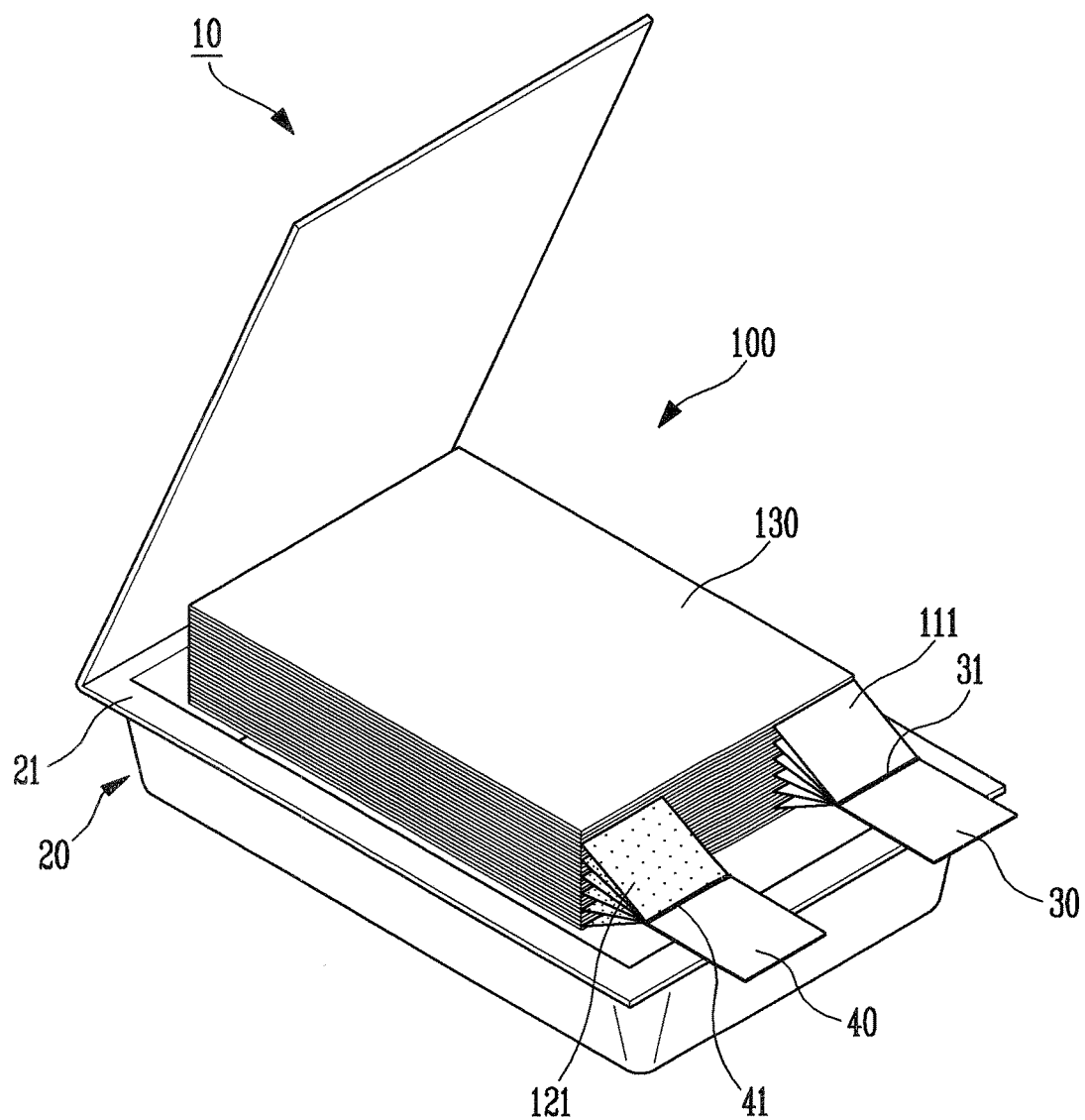
FIG. 1 is an exploded perspective view of a secondary battery including an electrode assembly according to the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to another element or be indirectly connected to the another element with one or more intervening elements interposed therebetween. Hereinafter, like reference numerals refer to like elements.

Recognizing that sizes and thicknesses of constituent members shown in the accompanying drawings are arbitrarily given for better understanding and ease of description, the present invention is not limited to the illustrated sizes and thicknesses.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, an exemplary embodiment of the present invention will be described with reference to FIGS. 1 to 3B.

FIG. 1 is an exploded perspective view of a secondary battery 10 including an electrode assembly 100 according to the present invention.

The secondary battery according to the present invention may include an electrode assembly 100 including a first electrode plate 110 provided with a first tab portion 111, a second electrode plate 120 provided with a second tab portion 121, and a separator 130 interposed between the electrode plates 110 and 120. In the electrode assembly 100, the width a of the first or second tab portion 111 or 121 is in the range of greater than half the width of x, with x being half the width of the first or second electrode plate to below the half x of the width of the first or second electrode plate, and the first or second tab portion 111 or 121 is provided to have a spacing distance b from a central portion of the first or second electrode plate to a starting portion of the first or second tab portion. The spacing distance b is in the range from over 0 mm to below 0.5 of the half x of the width of each of the electrode plates.

Referring to FIG. 1, the secondary battery 10 according to the present invention may include a battery case 20, and the electrode assembly 100 and an electrolyte (not shown), which are accommodated in the battery case 20. The electrode assembly 100 may be a stacked electrode assembly formed by stacking a plurality of first electrode plates 110 and a plurality of second electrode plates 120. In this instance, the first and second electrode plates 110 and 120 may have different polarities from each other. Therefore, the first and second electrode plates 110 and 120 may be stacked while interposing separators 130 therebetween so that the electrode plates do not directly face each other.

Figure 2A:
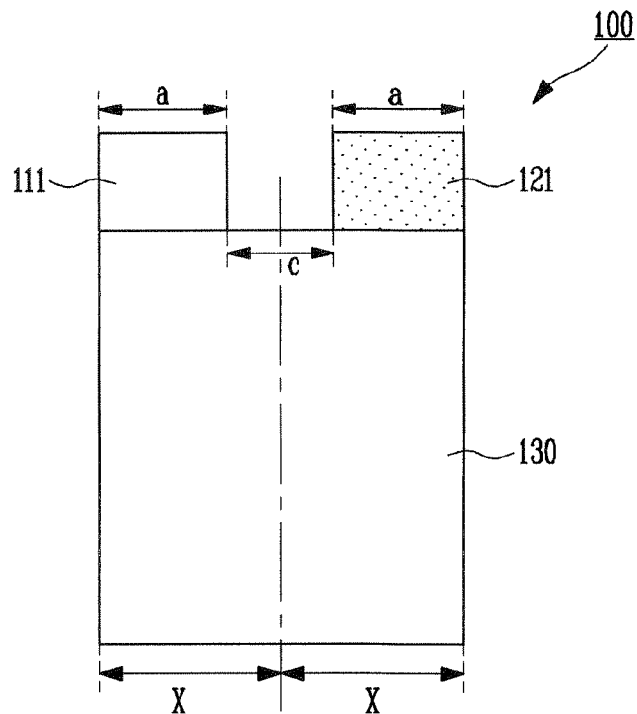
FIG. 2A is a sectional view of an electrode assembly according to an embodiment of the present invention.
Figure 2B:
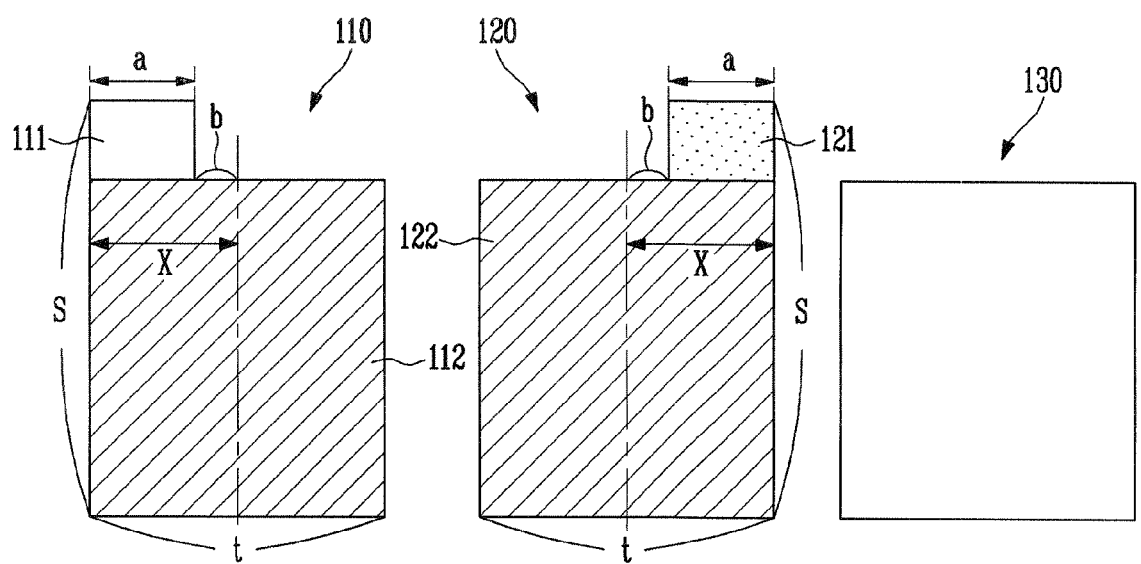
FIG. 2B illustrates sectional views respectively showing a first electrode plate, a second electrode plate and a separator, which constitute the electrode assembly.
Figure 2C:
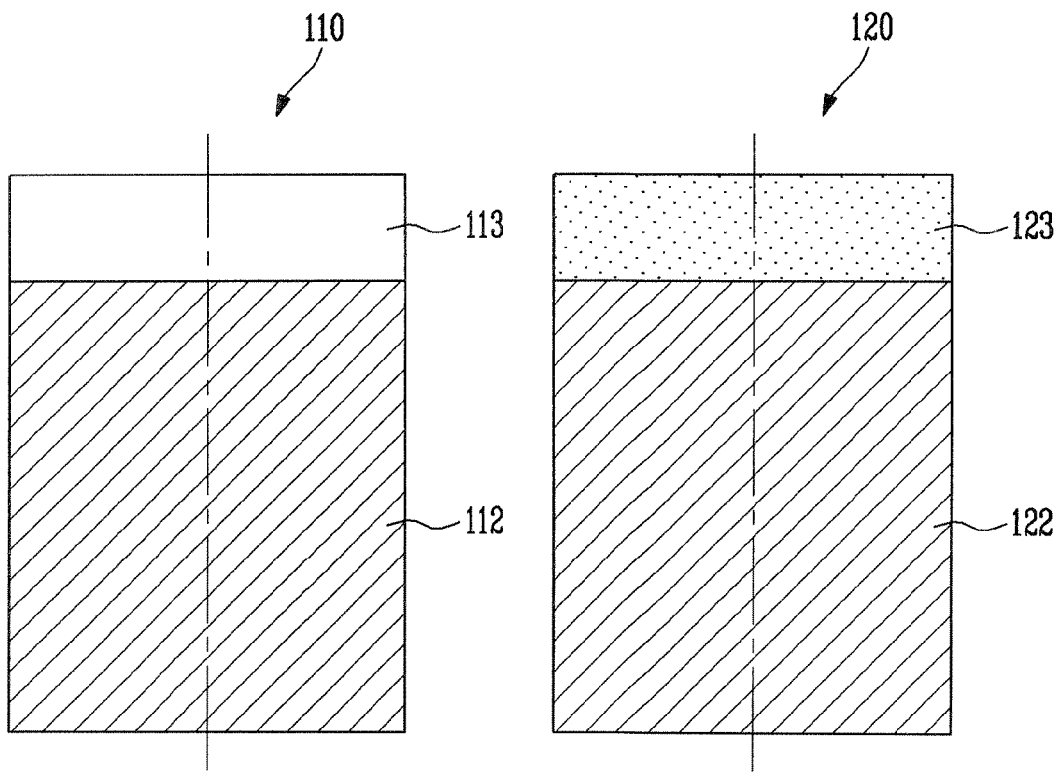
FIG. 2C illustrates sectional views respectively showing states before first and second tab portions of the first and second electrode plates are formed.

FIG. 2A is a sectional view of the electrode assembly according to an embodiment of the present invention. FIG. 2B illustrates sectional views respectively showing a first electrode plate, a second electrode plate and a separator, which constitute the electrode assembly. FIG. 2C illustrates sectional views respectively showing states before first and second tab portions of the first and second electrode plates are formed.

Referring to FIGS. 2A to 2C, the first and second electrode plates 110 and 120 may include first and second electrode active material layers 112 and 122 on which electrode active materials are coated, and first and second non-coating portions 113 and 123 (see FIG. 2C) on which the electrode active materials are not coated, respectively. The first and second non-coating portions 113 and 123 may be positioned one sides of the first and second electrode plates 110 and 120, respectively.

The first and second tab portions 111 and 112 provided to the first and second electrode plates 110 and 120 may be formed by punching the non-coating portions 113 and 123 of the first and second electrode plates 110 and 120 using molds, respectively.

FIG. 2C illustrates the states of the first and second electrode plates 110 and 120 before they are punched, respectively.

Referring to FIG. 2C, the first electrode plate 110 may be a positive electrode plate. The positive electrode plate may be formed by coating a positive electrode active material on a single surface or both surfaces of a positive electrode collector. The positive electrode collector generally is a material with high conductivity, and is not particularly limited as long as it is one that does not induce a chemical change. The positive electrode active material that constitutes the first electrode active material layer 112 may include a layered compound containing lithium.

The second electrode plate 120 may be a negative electrode plate. The negative electrode plate may be formed by coating a negative electrode active material on a single surface or both surfaces of a negative electrode collector. The negative electrode collector may be a conductive metal, and the negative electrode active material may include graphite or the like.

The first and second tab portions 111 and 121 of FIG. 2A may be formed by punching the first and second non-coating portions 113 and 123 of the first and second electrode plates 110 and 120, shown in FIG. 2C, using molds, respectively. Although it has been illustrated in this embodiment that the first and second tab portions 111 and 121 are formed in the shape of rectangles respectively protruding from one side of the first and second active material layers 112 and 122, the present invention is not limited thereto. The first and second tab portions 111 and 121 may be modified using a punching method, or the like.

One of methods for manufacturing a large-capacity secondary battery is to use large-area electrode plates in an electrode assembly that constitutes the secondary battery. In the large-area electrode plates, as the area of each of the electrode plates is increased, the amount of current flowing in the electrode plate is also increased. Accordingly, the areas of tab portions provided to the respective electrode plates may also be increased. On the other hand, if the area of each of the tab portions is increased greater than a predetermined area, the tab portions having different polarities come in contact with each other, thereby resulting in a possibility of a short circuit or the like.

Accordingly, in the electrode assembly 100 that constitutes the secondary battery 10 of this embodiment, the width a of the first or second tab portion 111 or 121 is in the range from more than half the width of x in which x is half the width of the first or second electrode plate to below the half x of the width of the first or second electrode plate. The first or second tab portion 111 or 121 is provided to have a spacing distance b from the central portion of the first or second electrode plate 110 and 120 to the starting portion of the first or second tab portion 111 or 121. The spacing distance b is in the range from over 0 mm to below 0.5 of the half x of the width of each of the electrode plates.

If the width a of the first or second tab portions 111 and 121 is less than 0.5 of the half x of the width of the first or second electrode plate, it may be difficult to accommodate the amount of current flowing in the electrode plate. Further, heat may be generated due to the increase in the resistance of the first or second tab portion 111 or 121. Therefore, the lifetime and characteristic of the secondary battery may be deteriorated. If the width a of the first or second tab portion 111 and 121 is more than the half x of the first or second electrode plate, the first and second tab portions 111 and 121 having different polarities come in contact with each other, thereby resulting in a short circuit or the like.

If the spacing distance b of the first or second tab portions 111 and 121 from the central portion of the first or second electrode plate is 0 mm, the first and second tab portions 111 and 121 come in contact with each other, thereby resulting in a short circuit. If the spacing distance b is more than 0.5 of the half x of the width of each of the electrode plates, the distance of current flowing from the interior of each of the electrode plates to the first or second tab portion 111 or 121 is relatively increased. Hence, a region in which the current does not flow in the interior of each of the electrode plates, and therefore, the power of the secondary battery 10 may be decreased.

Figure 3A:
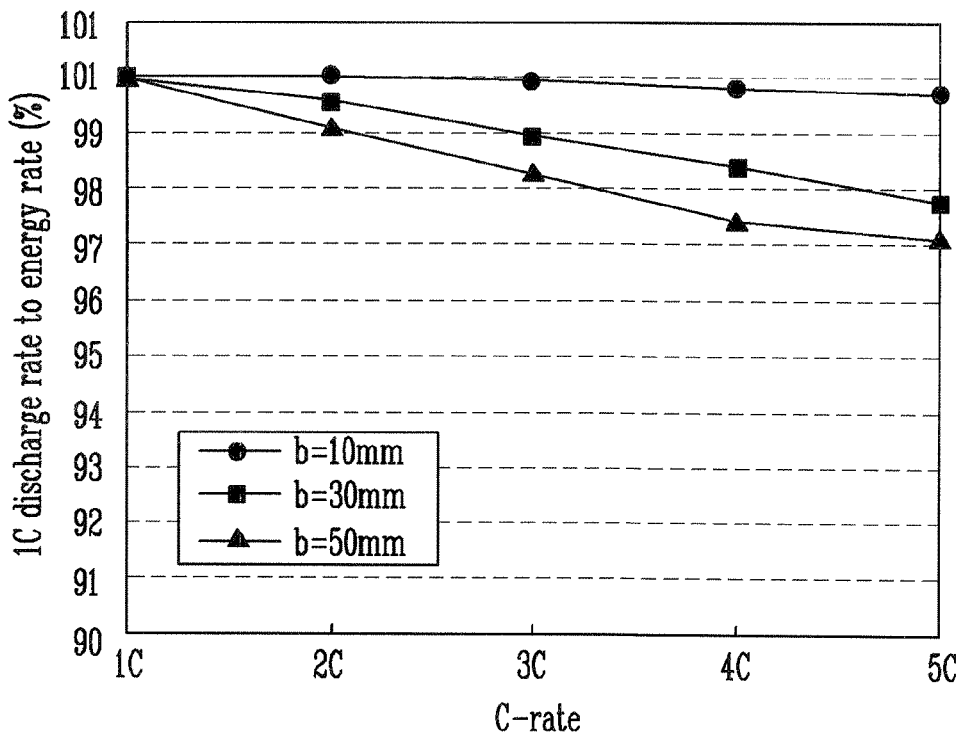
FIG. 3A is a graph showing characteristics of a discharge rate for each C-rate with respect to spacing distances of the first and second tab portion from central portions of the electrode plates.
Figure 3B:
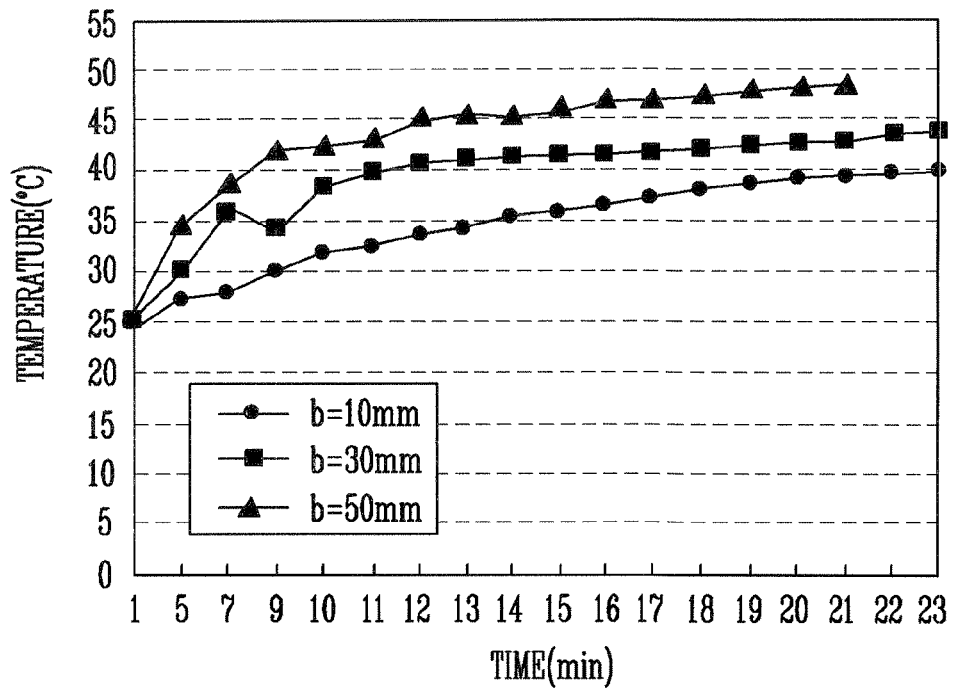
FIG. 3B is a graph showing temperature distributions with respect to spacing distances of the first and second tab portions in 5C discharge.

FIG. 3A is a graph showing characteristics of a discharge rate for each C-rate with respect to spacing distances b of the first and second tab portion 111 and 121 (see FIG. 2B) from the central portions of the electrode plates. FIG. 3B is a graph showing temperature distributions with respect to spacing distances b of the first and second tab portions 111 and 121 (see FIG. 2B) in 5C discharge.

In FIG. 3A, characteristics of a discharge rate for each C-rate were observed by respectively setting spacing distances b of the first and second tab portion 111 and 121 from the central portions of the electrode plates as 10 mm, 30 mm and 50 mm. 1C means an amount of current corresponding to the capacity of the secondary battery 10 including the electrode assembly 100, and 2C, 3C, 4C and 5C mean amounts of current two, three, four and five times greater than that of current in 1C, respectively. That is, as 1C is increased to 2C, 3C, 4C and 5C, the amount of current in discharge is increased accordingly. As the discharge is generated at a high C-rate, the secondary battery 10 is discharged within a short period of time, and thus the efficiency of the secondary battery can be considered.

Referring to FIG. 3A, it can be seen that as the spacing distance b of each of the first and second tab portion 111 or 121 is short, the discharge rate is increased at a high C-rate. That is, as the width of the first or second tab portion 111 or 121, i.e., the area of the first or second tab portion 111 or 121 is increased, the velocity of current flowing in each of the electrode plates is increased at a high C-rate, and the resistance of the first or second tab portion 111 or 121 is decreased at the same time. Thus, the characteristic of the discharge rate is enhanced as the spacing distance b of the first or second tab portion 111 or 121 from the central portion of the first or second electrode plate is shortened.

FIG. 3B illustrates temperature distributions of the secondary battery 10 with respect to spacing distances b of the first and second tab portions 111 and 121 in 5C discharge. In a case where the secondary battery 10 is discharged at a high C-rate such as 5C, high current flows in the first and second tab portions 111 and 121 of the secondary battery 10. Hence, the resistance of the tab portions is increased, and therefore, the amount of heat generation is increased.

Referring to FIG. 3B, it can be seen that as the spacing distance b of each of the first and second tab portion 111 or 121 is increased to 10 mm, 30 mm and 50 mm, the temperature of the secondary battery 10 is increased. That is, as the spacing distance b of each of the first and second tab portion 111 or 121 is shortened, the area of current flowing in each of the electrode plates is increased, and hence the resistance of each of the first and second tab portions 111 and 121 is decreased. Therefore, the amount of heat generation is decreased, and accordingly, the temperature of the secondary battery 10 is formed low. Further, if the resistance of each of the first and second tab portions 111 and 121 is decreased, the power characteristic of the secondary battery is also enhanced.

That is, as shown in FIGS. 3A and 3B, as the spacing distance of the first or second tab portions 111 or 121 from the central portion of the first or second electrode plate is shortened, the velocity of current flowing in each of the first and second electrode plates 110 and 120, and the resistance of each of the first and second tab portions 111 and 121 is decreased. Thus, the usage rate of the electrode plate may be increased, and the characteristic for each C-rate and power characteristic of the secondary battery 10 may be enhanced.

Referring back to FIGS. 2A and 2B, the electrode assembly 100 according to this embodiment may be formed by stacking the first and second electrode plates 110 and 120 while interposing the separator 130 therebetween.

The first or second electrode plate 110 or 120 is formed in the shape of a rectangle composed of minor- and major-axis corners, and the first or second tab portion 111 or 121 may be vertically protrude from a short-axis corner of the first or second electrode plates 110 or 120. The first and second tab portions 111 and 121 may be exposed from the separator 130 so as to be parallel with each other.

In this instance, the length s of the major-axis corner of the first or second electrode plate 110 or 120 may be less than two times greater than the length t of the minor-axis corner of each of the electrode plates. In a case where the length s of the major-axis corner exceeds two times with respect to the length t of the minor-axis corner, a region in which current does not flow in the electrode plate may occur.

In the first and second electrode plates 110 and 120, the first and second tab portions 111 and 121 serve as passages along which current flows to the exterior of the secondary battery. If the area of each of the first and second electrode plates 110 and 120 is increased, each of the first and second tab portions 111 and 121 is further from each of the electrode plates. Therefore, the flow of current transferred through the first and second tab portions 111 and 121 may not be transferred up to edges of the first and second electrode plates 110 and 120, and accordingly, the capacity of the secondary battery 10 is decreased. This may cause a serious problem in a high-capacity secondary battery using a large-area electrode plate.

In the electrode assembly 100 according to this embodiment, the first and second tab portions 111 and 121 are extracted from the same portions of the respective first and second electrode plates 110 and 120 so as to be parallel with each other in the electrode assembly 100. In this instance, the interval c between the first and second tab portions 111 and 121 may be in the range from over 0 mm to below 500 mm.

If the interval c between the first and second tab portions 111 and 121 is 0 mm, a short circuit or the like may occur because the first and second tab portions 111 and 121 have different polarities from each other. On the other hand, if the interval c between the first and second tab portions 111 and 121 is 500 mm or longer, the high charge/discharge efficiency of the secondary battery 10 may be decreased.

As the interval c between the first and second tab portions 111 and 121 is widened, the probability of occurrence of a short circuit between the first and second tab portions 111 and 121 may be decreased. On the other hand, that the interval c between the first and second tab portions 111 and 121 is large, this means that the first and second tab portions 111 and 121 are provided distant from the center axis of the respective electrode plates. That is, the first or second tab portion 111 or 121 may be distance from an edge of the first or second electrode plate, and a region in which current does not flow in each of the electrode plates may occur. Therefore, the first and second tab portions 111 and 121 may be provided close to the central portions of the respective electrode plates 110 and 120 so as to enhance the efficiency of the secondary battery 10 by reducing the regions in which current does not flow in the respective first and second electrode plates 110 and 120.

As described above, the plurality of first and second tab portions 111 and 121 provided by stacking the plurality of first and second electrode plates 110 and 120 may be fusion-bonded together with first and second electrode tabs 30 and 40 so as to form fusion bonding portions 31 and 41, respectively. In this instance, the fusion bonding may be performed by at least one of laser welding and resistance welding. The first and second electrode tabs 30 and 40 may be, for example, nickel or copper.

The secondary battery 10 according to the present invention further may include a battery case 20 and an electrolyte (not shown), and may be formed by accommodating the electrode assembly according to this exemplary embodiment and the electrolyte in the battery case 20. The secondary battery 10 according to the present invention has a capacity of 10 Ah or greater. The secondary battery 10 according to this embodiment may use a large-area electrode plate so as to have a large capacity. Although the large area electrode plate is used in the secondary battery 10, there is no region in which current does not flow in the electrode plate, and the resistance of a tab portion is not large, so that the electrode plate can be effectively used. The battery case 20 may include a main body that accommodates the electrode assembly 100 and a cover that covers the main body. A sealing portion 21 is provided along an edge of the main body. The secondary battery 10 according to present invention may be manufactured by accommodating the electrode assembly 100 and the electrolyte in the main body and fusion bonding the sealing portion 21 in the state where the main body and the cover are tightly adhered to each other.

Other exemplary embodiments will be described with reference to FIGS. 4 to 6. Since contents described in FIGS. 4 to 6 except the following description are identical to those described in FIGS. 1 to 3B, they will be omitted to avoid redundancy.

Figure 4:
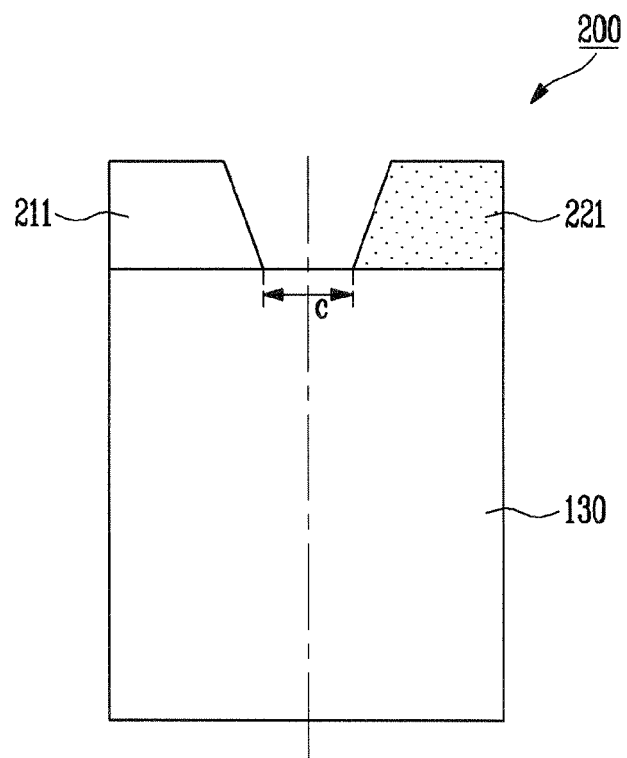
FIG. 4 is a sectional view of an electrode assembly according to another embodiment of the present invention.
Figure 5:
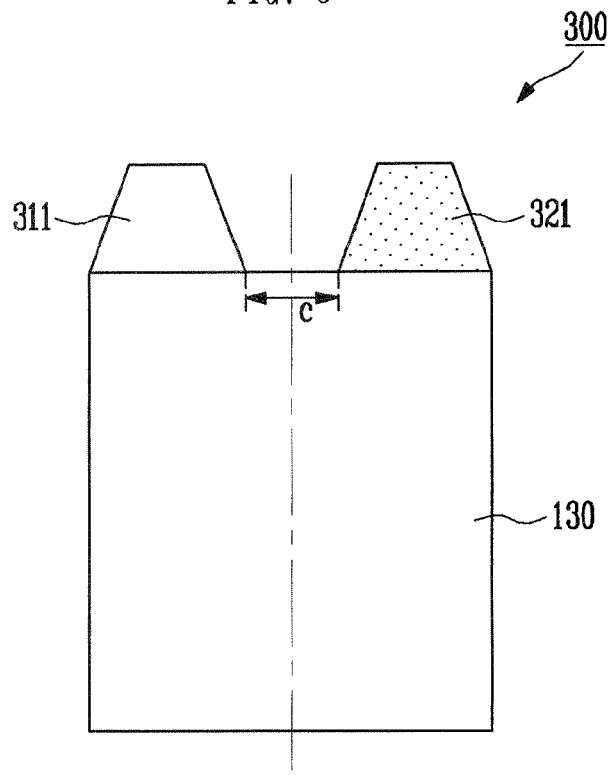
FIG. 5 is a sectional view of an electrode assembly according to still another embodiment of the present invention.
Figure 6:
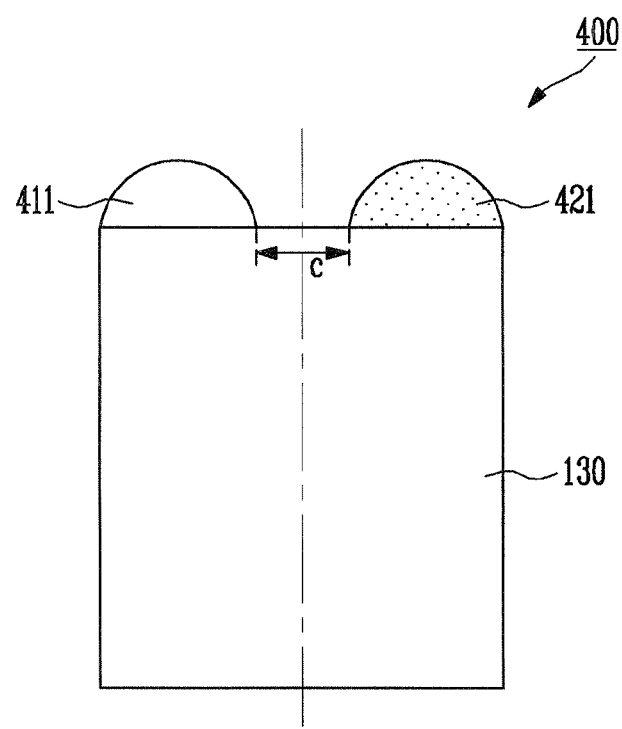
FIG. 6 is a sectional view of an electrode assembly according to still another embodiment of the present invention.

FIGS. 4 to 6 are sectional views of electrode assemblies according to embodiments of the present invention, respectively.

Referring to FIG. 4, an electrode assembly 200 according to another embodiment of the present invention may be formed by stacking electrode plates each having first or second tab portion 211 and 221 and a separator interposed therebetween. Each of the first and second tab portions 211 and 221 may have at least one chamfered corner. In this instance, the chamfered corner of the first or second tab portion 211 or 221 may be provided close to a central portion of the first or second electrode plate.

If the first and second tab portions 211 and 221 are provided close to the central portions of the respective electrode plates, the distances from the first and second tab portions 211 and 222 from edges of the respective electrode plates can be maintained to be short. If the distance is maintained short, the distance of current flowing in the electrode plate is maintained short, and therefore, the region in which the current does not flow in the electrode plate is relatively decreased. On the other hand, since the first and second tab portions 211 and 221 have different polarities from each other, there is a risk of a short circuit or the like. Therefore, the first and second tab portions 211 and 221 are necessarily spaced apart from each other at a predetermined interval.

As described above, in a case where at least one corner of each of the first and second tab portions 211 and 221, particularly the corner close to the central portion of the electrode plate is chamfered, it is possible to prevent the first and second tab portions 211 and 221 from being short circuited by coming in contact with each other, although the interval c between the first and second tab portions 211 and 221 is maintained short.

In a case where the first and second tab portions 211 and 221 are punched in the shape of a rectangle, a scratch or burr of the electrode plate is easily generated because the base material of the electrode plate is thin. Particularly, the burr is well generated at a corner portion of each of the first and second tab portions 211 and 221. Thus, perpendicular corner portions of the first and second tab portions 211 and 221 by chamfering the first and second tab portions 211 and 221, so that it is possible to prevent the generation of a scratch or burr of the electrode plates.

As shown in FIG. 5, in an electrode assembly 300 according to still another exemplary embodiment of the present invention, both corners of first or second tab portions 311 or 321 may be chamfered. The chamfering angle of each of the first and second tab portions 311 and 321 may be in the range from over zero degree to below 90 degrees. In this instance, it is advantageous that the chamfering angle increases. Specifically, although the interval c between the first and second tab portions is maintained short, the tab portions are gradually spaced apart from each other in the length direction, so that it is possible to prevent a short circuit between the tab portions having different polarities from each other. In a case where the electrode plates are stacked, there is no interference between the tab portions, so that the electrode plates may be more effectively stacked.

Referring to FIG. 6, in an electrode assembly 400 according to still another embodiment of the present invention, a first or second tab portion 411 and 421 provided to each electrode plate may be chamfered in a round shape. In a case where each of the first and second tab portions 411 and 421 is chamfered in a round shape as described in this embodiment, the angle obtained by punching each of the electrode plates is gentle, so that the generation of burrs may be more reduced.

In the aforementioned embodiments, the chamfered corner provided to each of the first and second tab portions may be formed at one or both sides of each of the first and second tab portions, and the shape of the chamfered corner may be variously modified.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising an electrode assembly, wherein the electrode assembly comprises:
   a first electrode plate having a rectangular prism shape with two long sides, two short sides and two surfaces, said short sides being shorter than said long sides and said first electrode plate is provided with a first tab portion extending from one of the two short sides of the first electrode plate and with an edge that is flush to solely one of the two long sides of the first electrode plate;

a second electrode plate having a rectangular prism shape with two long sides, two short sides and two surfaces, said short sides being shorter than said long sides and said second electrode plate is provided with a second tab portion extending from one of the two short sides of the second electrode plate and with an edge that is flush to solely one of the two long sides of the second electrode plate; and a separator interposed between the electrode plates, wherein at least one of the first and second tab portions are formed so that the width of each of the tab portions and the distance from a central portion of each of the electrode plates to a starting portion of each of the tab portions satisfy the following expressions, and wherein the interval between the first and second tab portions is in the range from over 0 mm to less than 500 mm, $0.5x \leq a \leq x$, and $0 < b < 0.5x$, where "a" is a width of each of the tab portions, "b" is a distance from a central portion of each of the electrode plates to a starting portion of each of the tab portions, and "x" is ½ of an entire width of each of the electrode plates.

2. The secondary battery according to claim 1, wherein the electrode assembly is a stacked electrode assembly formed by stacking a plurality of first and second electrode plates.

3. The secondary battery according to claim 1, wherein the secondary battery has a capacity of 10 Ah or greater.

4. The secondary battery according to claim 1, wherein the length of the long sides of the first or second electrode plate is approximately two times greater than that of the short sides of the first or second electrode plate.

5. The secondary battery according to claim 1, wherein the first and second tab portions are extracted from the same portions of the respective first and second electrode plates in the electrode assembly.

6. The secondary battery according to claim 1, wherein each of the first and second electrode plates comprises an electrode active material layer on which an electrode active material is coated and a non-coating portion on which the electrode active material is not coated, and the non-coating portion is positioned at one side of each of the first and second electrode plates.

7. The secondary battery according to claim 6, wherein the first and second tab portions are formed by punching the non-coating portions of the first and second electrode plates, respectively.

8. The secondary battery according to claim 7, wherein the first and second tab portions are exposed from the separator so as to be parallel with each other.

9. The secondary battery according to claim 8, wherein at least one corner of the first or second tab portion is chamfered.

10. The secondary battery according to claim 9, wherein the chamfered corner of the first or second tab portion is positioned close to the central portion of the first or second electrode plate.

11. The secondary battery according to claim 9, wherein the first or second tab portion is chamfered to form a round shape.

12. The secondary battery according to claim 1, wherein the first and second tab portions is fusion-bonded together with first and second electrode tabs, respectively.

13. The secondary battery according to claim 1, further comprising a battery case and an electrolyte, wherein the secondary battery is formed by accommodating the electrode assembly and the electrolyte in the battery case.

14. An electrode assembly for a secondary battery, comprising:

a first electrode plate having a rectangular prism shape with two long sides, two short sides and two surfaces, said short sides being shorter than said long sides and said first electrode plate is provided with a first tab portion extending from one of the two short sides of the first electrode plate and with an edge that is flush to solely one of the two long sides of the first electrode plate;

a second electrode plate having a rectangular prism shape with two long sides, two short sides and two surfaces, said short sides being shorter than said long sides and said second electrode plate is provided with a second tab portion extending from one of the two short sides of the second electrode plate and with an edge that is flush to solely one of the two long sides of the second electrode plate; and a separator interposed between the electrode plates, wherein a width the first or second tab portions is in a range from less than half a width of the first or second electrode plates to more than ¼ the width of the first or second electrode plates, and wherein a spacing distance between the first and second tab portions is in a range from greater than 0 mm to less than ¼ of the width of the first or second electrode plate.

15. The secondary battery according to claim 14, wherein the length of the long sides of the first or second electrode plate is approximately two times greater than that of the short sides of the first or second electrode plate.

16. The secondary battery according to claim 14, wherein the first and second tab portions extend from a portion of the first and second electrode plates in the electrode assembly.

17. The secondary battery according to claim 14, wherein at least one corner of the first or second tab portion is chamfered or rounded in shape.

* * * * *